April 21, 1953

G. D. FORBES 2,636,119

PULSE CONTROL CIRCUIT

Filed July 9, 1945

INVENTOR
GORDON D. FORBES
BY William D. Hall
ATTORNEY

Patented Apr. 21, 1953

2,636,119

UNITED STATES PATENT OFFICE 2,636,119

PULSE CONTROL CIRCUIT

Gordon D. Forbes, Sudbury, Mass., assignor, by mesne assignments, to the United States of America as represented by the Secretary of War Application July 9, 1945, Serial No. 604,045

1 Claim. (Cl. 250—27)

Figure 1:
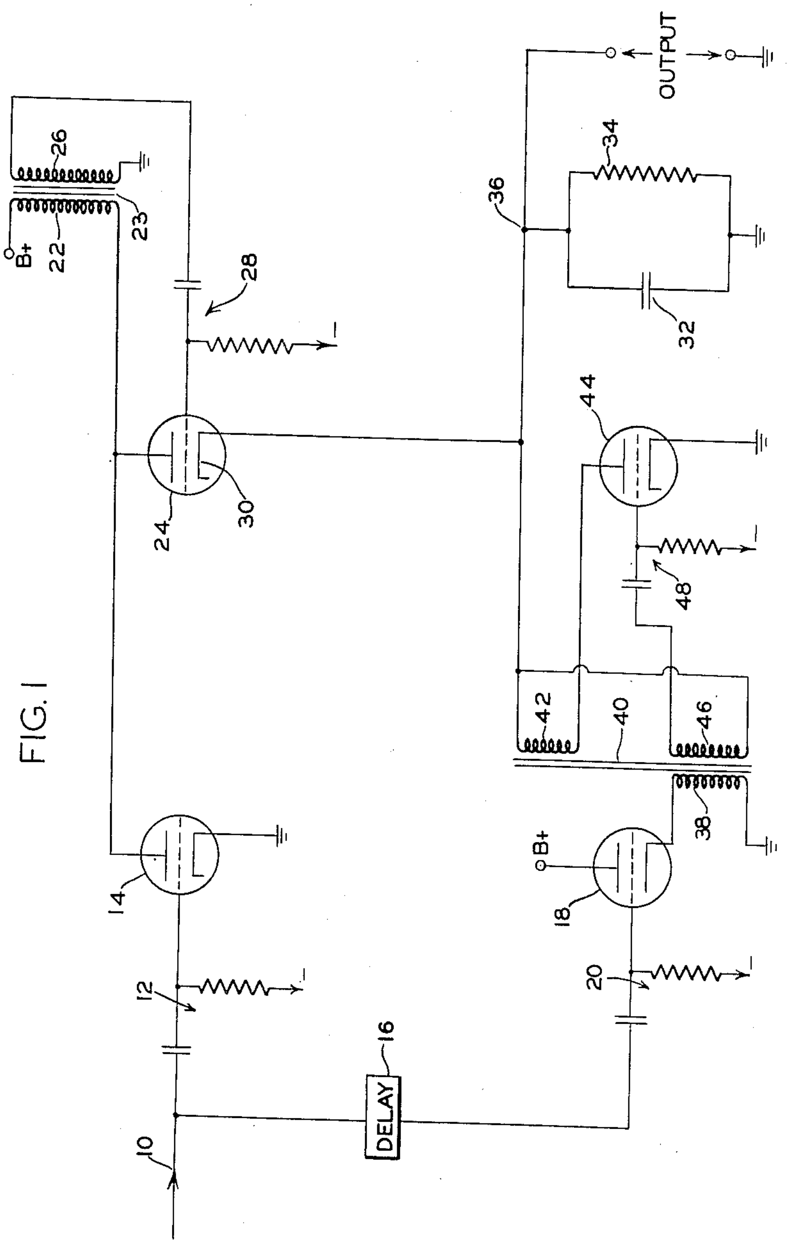

This invention relates to electrical circuits and more particularly to circuits designed to produce relatively short rectangular pulses.

In many radio circuits it is desirable to produce rectangular pulses having a very short time duration, for example, of the order of one microsecond. It is also desirable to form these pulses with sharp leading and trailing edges. The type of circuit known to the art as a blocking oscillator produces a very sharp rise or fall in voltage and is sometimes used as a pulse forming circuit. The blocking oscillator has a disadvantage that the width of the pulse so formed is not easily variable.

It is an object of the present invention, therefore, to provide a circuit employing blocking oscillators for producing rectangular voltage pulses with steep leading and trailing edges and also to provide means whereby the pulse width is easily variable.

In accordance with the present invention there is provided a means for storing electrical energy, a blocking oscillator means to charge said storage means, and a second blocking oscillator means to discharge said storage means. Means are provided for triggering said blocking oscillators at predetermined time intervals.

For a better understanding of the invention, together with other and further objects thereof, reference is had to the following description taken in connection with the accompanying drawing which is a schematic wiring diagram of the invention.

The invention as shown consists of a means 10 for introducing a positive pulse. This positive pulse is coupled through network 12 to the control grid of a vacuum tube 14. This pulse is also applied to delay means 16, and the output of delay means 16 is applied to the control grid of a second vacuum tube 18 through network 20. The anode of vacuum tube 14 is connected to one terminal of a winding 22 on the transformer 23. A second terminal of winding 22 is connected to a suitable source of plate potential. Winding 22 also serves as an anode load for vacuum tube 24. A second winding 26 of transformer 23 has one terminal thereof maintained at a point of fixed reference potential. A second terminal of winding 26 is connected through network 28 to the control grid of tube 24. Cathode 30 of tube 24 is connected to ground through the parallel combination of capacitor 32 and resistor 34. The ungrounded common terminal between capacitor 32 and resistor 34 is identified by the reference character 36.

The anode of vacuum tube 18 is returned to a suitable source of plate potential. The cathode of tube 18 is connected to ground through a winding 38 of a transformer 40. A second winding 42 of transformer 40 is connected from point 36 to the anode of a vacuum tube 44. A third winding 46 of transformer 40 has one terminal connected to point 36 and a second terminal connected through a network 48 to the control grid of tube 44. The cathode of tube 44 is connected to ground. Bias networks 12, 20, 28 and 48 are all returned to a suitable point of negative potential represented by minus signs in the drawing.

The operation of the circuit may be described as follows: the pulse applied at point 10 is amplified in tube 14 and this amplified pulse serves to trigger the blocking oscillator circuit made up of transformer 23, vacuum tube 24, and the parallel combination of capacitor 32 and resistor 34. When this blocking oscillator circuit is triggered, the current flowing through tube 24 also flows through capacitor 32 and, therefore, causes the potential at point 36 to be raised above ground potential. Since the charging path for capacitor 32 has a relatively short time constant, point 36 will rise in potential almost as rapidly as does the control grid of tube 24. The potential at point 36 at the end of this charging cycle will be a large fraction of the plate supply potential of tube 24. When the control grid of tube 24 starts to drop due to the blocking oscillator action, capacitor 32 starts to discharge through resistor 34. The time constant of this discharge path is made relatively long, say of the order of 200 microseconds. The potential at point 36, therefore, remains substantially constant for at least 20 microseconds.

During the charging operation a blocking oscillator comprising transformer 40 and tube 44 was held inoperative by the bias of the control grid of tube 44, but the positive trigger that was applied to the input of delay means 16 appears at the control grid of tube 18 a short time after the pulse is applied to the point 10. This time interval is determined by the design of delay means 16. A winding 38 of transformer 40 acts as a cathode load for tube 18, therefore, the pulse that was applied to the control grid 18 will cause a similar pulse to appear across winding 38. The control grid of tube 44 was made less negative by the rise in potential at point 36 due to the charging of capacitor 32 and the pulse in winding 38 induces a voltage in winding 46 in such a direction as to further raise the potential of the control grid of tube 44. Tube 44 now conducts, and the current flowing through winding 42 causes the potential of the control grid of tube 44 to rise even higher. The anode current of tube 44 is supplied by capacitor 32, and since tube 44 conducts heavily, the potential on capacitor 32 will drop rapidly. The result is that the potential at point 36 will drop sharply to approximately zero potential. At this point tube 44 will no longer conduct, and any charge remaining on capacitor 32 will be discharged through resistor 34. The variation of potential at point 36 may be described as follows. Before the pulse is applied at point 10, the potential at this point is substantially zero. A sharp rise in potential occurs at the instant the trigger is applied at point 10. The potential at this point 36 then remains relatively constant for a time interval equal to the delay caused by delay means 16. At the end of this time interval the potential at point 36 drops rapidly to approximately zero potential. The resulting signal is a pulse having a substantially rectangular shape with very steep leading and trailing edges. By proper design this pulse may have a time of rise or fall of from one-tenth to one-twentieth of a microsecond.

The advantages of this circuit appear to be obvious. A very sharp rectangular voltage pulse is produced. The amplitude of this pulse is a large fraction of the plate potential supply, and the width of the pulse may be easily controlled by controlling the time delay of means 16.

While there has been described what is at present considered the preferred embodiment of the invention, it will be obvious to those skilled in the art that various changes and modifications may be made therein without departing from the invention.

What is claimed is:

A circuit for generating pulses of short accurately controlled time duration having steep leading and trailing edges comprising, a source of electrical energy having at least one positive terminal and a negative terminal, said negative terminal being connected to ground; a source of bias potential having a positive terminal and at least one negative terminal, said positive terminal being connected to ground; a first, second, third and fourth vacuum tube each having at least a cathode, an anode and a control grid; first transformer means having at least a primary and a secondary winding, said primary winding having a first terminal thereof connected to the anodes of said first and second vacuum tubes, and having a second terminal thereof connected to a positive terminal of said source of electrical energy, and said secondary winding having a first terminal thereof connected to ground and a second terminal thereof connected to the control grid of said second vacuum tube through a grid coupling circuit, said grid coupling circuit being returned to a negative terminal of said bias source; means connecting said cathode of said first vacuum tube to ground; an energy storage device including a storage capacitor having one terminal thereof connected to ground; a second transformer having at least a primary, a secondary and a tertiary winding, said primary winding having a first terminal thereof connected to ground and a second terminal thereof connected to the cathode of said third vacuum tube, said secondary winding having one terminal thereof connected to the anode of said fourth vacuum tube and a second terminal thereof connected to said cathode of said second vacuum tube and to the ungrounded terminal of said capacitor, and said tertiary winding having a first terminal thereof connected to said second terminal of said secondary winding and a second terminal thereof connected through a second grid coupling circuit to the control grid of said fourth vacuum tube, said second coupling circuit being returned to a negative terminal of said bias source; means connecting said anode of said third vacuum tube to a positive terminal of said source of electrical energy; a delay means; a third grid coupling circuit connecting the output of said delay means to the control grid of said third vacuum tube, said third grid coupling circuit being returned to a negative terminal of said bias source; means including a fourth grid coupling circuit for applying a controlling pulse simultaneously to the grid of said first vacuum tube and the input of said delay means whereby a substantially rectangular voltage pulse is caused to appear across said capacitor, the leading edge of said pulse corresponding substantially in time to the time said first pulse is applied to said first vacuum tube and the duration of said voltage pulse corresponding substantially to the time delay introduced by said delay means.

GORDON D. FORBES.

References Cited in the file of this patent

UNITED STATES PATENTS

| Number | Name | Date |
|---|---|---|
| 1,898,181 | Hansell | Feb. 21, 1933 |
| 2,419,340 | Easton | Apr. 22, 1937 |
| 2,179,105 | Sidney | Nov. 7, 1939 |
| 2,230,926 | Bingley | Feb. 4, 1941 |
| 2,233,596 | Faudell | Mar. 4, 1941 |
| 2,275,460 | Page | Mar. 10, 1942 |
| 2,277,000 | Bingley | Mar. 17, 1942 |
| 2,297,742 | Campbell | Oct. 6, 1942 |
| 2,405,069 | Tonks | July 30, 1946 |
| 2,409,897 | Rado | Oct. 22, 1946 |
| 2,413,440 | Farrington | Dec. 31, 1946 |
| 2,415,567 | Schoenfeld | Feb. 11, 1947 |
| 2,420,516 | Bischoff | May 13, 1947 |
| 2,457,140 | Frankel | Dec. 28, 1948 |
| 2,472,209 | Hall | June 7, 1949 |
| 2,567,247 | Spalding | Sept. 11, 1951 |

FOREIGN PATENTS

| Number | Country | Date |
|---|---|---|
| 528,192 | Great Britain | Oct. 24, 1940 |